US008050860B2

(12) United States Patent
Peyrucain et al.

(10) Patent No.: US 8,050,860 B2
(45) Date of Patent: Nov. 1, 2011

(54) METHOD AND DEVICE FOR DISPLAYING A FLIGHT PLAN OF AN AIRCRAFT

(75) Inventors: Eric Peyrucain, Saint-Genies Bellevue (FR); Philippe Haas, Toulouse (FR); Véronique Roan, Tournefeuille (FR); Gautier Taravella, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 752 days.

(21) Appl. No.: 11/828,896

(22) Filed: Jul. 26, 2007

(65) Prior Publication Data

US 2008/0027629 A1    Jan. 31, 2008

(30) Foreign Application Priority Data

Jul. 31, 2006 (FR) ..................................... 06 06991

(51) Int. Cl.
*G01C 21/00* (2006.01)
(52) U.S. Cl. ................ 701/206; 701/3; 701/4; 701/211; 701/301; 340/971; 340/973; 340/974; 340/976
(58) Field of Classification Search .................... 701/206
See application file for complete search history.

(56) References Cited

U.S. PATENT DOCUMENTS

| | | | | |
|---|---|---|---|---|
| 5,208,590 A | * | 5/1993 | Pitts | 340/973 |
| 6,112,141 A | * | 8/2000 | Briffe et al. | 701/14 |
| 6,154,151 A | * | 11/2000 | McElreath et al. | 340/970 |
| 6,163,743 A | * | 12/2000 | Bomans et al. | 701/3 |
| 6,542,796 B1 | * | 4/2003 | Gibbs et al. | 701/3 |
| 6,633,810 B1 | * | 10/2003 | Qureshi et al. | 701/206 |
| 6,995,690 B1 | * | 2/2006 | Chen et al. | 340/974 |
| 7,209,070 B2 | * | 4/2007 | Gilliland et al. | 342/26 B |
| 7,693,621 B1 | * | 4/2010 | Chamas | 701/16 |
| 7,783,393 B2 | * | 8/2010 | Tucker et al. | 701/4 |
| 2003/0139877 A1 | * | 7/2003 | Dwyer | 701/206 |
| 2003/0193410 A1 | * | 10/2003 | Chen et al. | 340/971 |
| 2004/0143393 A1 | * | 7/2004 | Knecht et al. | 701/301 |
| 2004/0210847 A1 | * | 10/2004 | Berson et al. | 715/788 |
| 2006/0004496 A1 | * | 1/2006 | Tucker et al. | 701/4 |
| 2006/0005147 A1 | * | 1/2006 | Hammack et al. | 715/805 |
| 2006/0250280 A1 | * | 11/2006 | Chen et al. | 340/974 |
| 2011/0137495 A1 | * | 6/2011 | Sacle et al. | 701/3 |

OTHER PUBLICATIONS

Preliminary Search Report dated Mar. 15, 2007.

* cited by examiner

*Primary Examiner* — Khoi Tran
*Assistant Examiner* — Jonathan L Sample
(74) *Attorney, Agent, or Firm* — Dickinson Wright PLLC

(57) ABSTRACT

The invention relates to a method and device for displaying a flight plan of an aircraft. The display device includes a display presenting unit making it possible to identify the flight phase of each waypoint of a flight plan which is displayed on a screen, and an activation unit making it possible to directly access a corresponding flight phase page.

10 Claims, 3 Drawing Sheets

METHOD AND DEVICE FOR DISPLAYING A FLIGHT PLAN OF AN AIRCRAFT

TECHNICAL FIELD OF THE INVENTION

The present invention relates to a method and a device for displaying a flight plan of an aircraft, in particular of a transport plane.

BACKGROUND OF THE INVENTION

It is known that such a display device generally comprises,
means for determining the flight plan of the aircraft which comprises, in a standard fashion, a plurality of successive waypoints;
display means for presenting in a textual manner, on a viewing screen of the aircraft, for example a multifunctional control and display screen of MCDU type ("Multifunction Control and Display Unit"), a flight plan page comprising a set of indications which illustrates said flight plan. This set of indications makes it possible to identify said waypoints and moreover provides additional information, such as the transit time, the altitude or the speed, which relate to these waypoints; and
actuation means which enable an operator to scroll said set of indications which is in general presented only in part on the viewing screen because of its significant size.

The flight plan may also be displayed, in a graphical manner, on a navigation screen, for example of ND type ("Navigation Display").

With a standard display device such as this, to plan a flight strategy by flight phases (climb, cruise, descent, etc.), the pilot must access other pages, with the aid of a button of the MCDU screen or by way of a shortcut which is totally separate from the aforesaid flight plan page. Within the framework of military use, for example on a military transport plane, the flight phases may comprise military phases such as a parachute drop, a low-altitude flight, in-flight refuelling, an autonomous approach, or a search and rescue procedure Moreover, with a standard display such as this, the pilot cannot directly associate the parts of his flight plan with parameters tied to the corresponding flight phase, this possibly being necessary in certain flight situations.

SUMMARY OF THE INVENTION

The present invention relates to a method of displaying a flight plan of an aircraft, which makes it possible to remedy the aforesaid drawbacks.

To this end, according to the invention, said method according to which:
the flight plan of the aircraft is determined, comprising a plurality of successive waypoints;
at least one main page comprising at least part of a set of indications which illustrates said flight plan is presented on at least one viewing screen of the aircraft, this set of indications making it possible to identify said waypoints and providing additional information relating to these waypoints; and
means making it possible to scroll said set of indications presented on the viewing screen are made available to an operator,
is noteworthy in that the following operations are moreover carried out:
for each of said waypoints, a flight phase which is associated with this waypoint is determined; and
a plurality of indication means, associated with said set of indications, is moreover presented on said viewing screen, each of said indication means being such that:
it comprises an identification zone which designates a particular flight phase;
said identification zone is positioned on the viewing screen alongside one or more waypoints which form part of the flight phase designated by this identification zone so that, with each waypoint of the flight plan is associated the corresponding flight phase; and
said identification zone is of interactive type that, when this identification zone is activated, the viewing screen replaces said main page with a flight phase page which provides information about the particular flight phase designated by said identification zone; and
means making it possible to activate an identification zone are made available to an operator.

Thus, by virtue of the interactive nature of the identification zones, an operator, in particular the pilot of the aircraft, can directly access the information relating to a flight phase which is associated with a waypoint. Moreover, by virtue of the identification nature of these identification zones, the operator can readily identify the flight page with which each waypoint is associated. Consequently, by virtue of the invention, an identification zone has a dual function:
a function of aiding direct access to the corresponding flight phase; and
a function of identifying the flight phase corresponding to the associated waypoint.

The method of display according to the invention therefore makes it possible to reduce the workload of the pilot, by providing in a very intuitive manner information about the flight plan, and by making it possible to access, in a fast, easy and intuitive manner, information tied to a flight phase, which information is presented on an appropriate flight phase page.

Preferably, said flight phase page comprises at least some of the following information relating to the flight phase considered:
information relating to performance;
predictions; and
parameters defining the said flight phase.

Furthermore, advantageously, means are provided for instructing a direct return from a flight phase page to the main page, thereby making it possible to facilitate as appropriate a return to said main page (flight plan page).

Furthermore, in a particular embodiment, on the viewing screen is presented moreover at least one auxiliary indication means;
which is situated on said set of indications at a datum of a waypoint of the flight plan;
which is of interactive type; and
which allows an operator to directly access a particular modification page making it possible to directly modify the value of said datum.

This particular embodiment makes it possible to more easily and more simply modify the flight plan.

In a first embodiment, said set of indications presents a textual form and comprises lists of waypoints and of associated information, which are viewed vertically on the viewing screen, for example an MCDU type screen.

Furthermore, in a second embodiment, said set of indications presents a textual and graphical binary form comprising:
a graphical view which illustrates a vertical plane and which presents graphically, by way of a main plot, said flight plan in said vertical plane; and
textual data relating to the waypoints and which are associated with said main plot.

Such a presentation of the information which is both graphical and textual makes it possible to simplify the reading and comprehension of the information viewed. In particular, the operator can get his bearings graphically on the flight plan before choosing the exact point at which he wishes possibly to make a modification or relating to which he reckons possibly to recover information.

In this second embodiment, advantageously the following is moreover presented:
- on said set of indications, an auxiliary plot illustrating the profile of the terrain which is situated under said flight plan; and/or
- on said set of indications, additional information relating to particular constraints.

The present invention also relates to a device for displaying a flight plan of an aircraft, in particular a transport plane.

According to the invention, said device of the type comprising:
- first means for determining the flight plan of the aircraft which comprises a plurality of successive waypoints;
- second means for presenting, on at least one viewing screen of the aircraft, at least one main page comprising at least part of the set of indications which illustrates said flight plan, this set of indications making it possible to identify said waypoints and providing additional information relating to these waypoints; and
- third means enabling an operator to scroll said set of indications presented on the viewing screen, is noteworthy in that:

said device moreover comprises:
- fourth means which are able to determine, for each of said waypoints, a flight phase which is associated with this waypoint; and
- fifth means enabling an operator to activate an identification zone; and said second means are formed in such a way as to moreover present, on said viewing screen, associated with said set of indications, a plurality of indication means, each of said indication means being such that:
- it comprises an identification zone which designates a particular flight phase;
- said identification zone is positioned on the viewing screen alongside one or more waypoints which form part of the flight phase designated by this identification zone so that, for each waypoint of the flight plan, the corresponding flight phase is known; and
- said identification zone is of interactive type so that, when this identification zone is activated, the viewing screen replaces said main page with a flight phase page which provides information about the particular flight phase designated by said identification zone.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
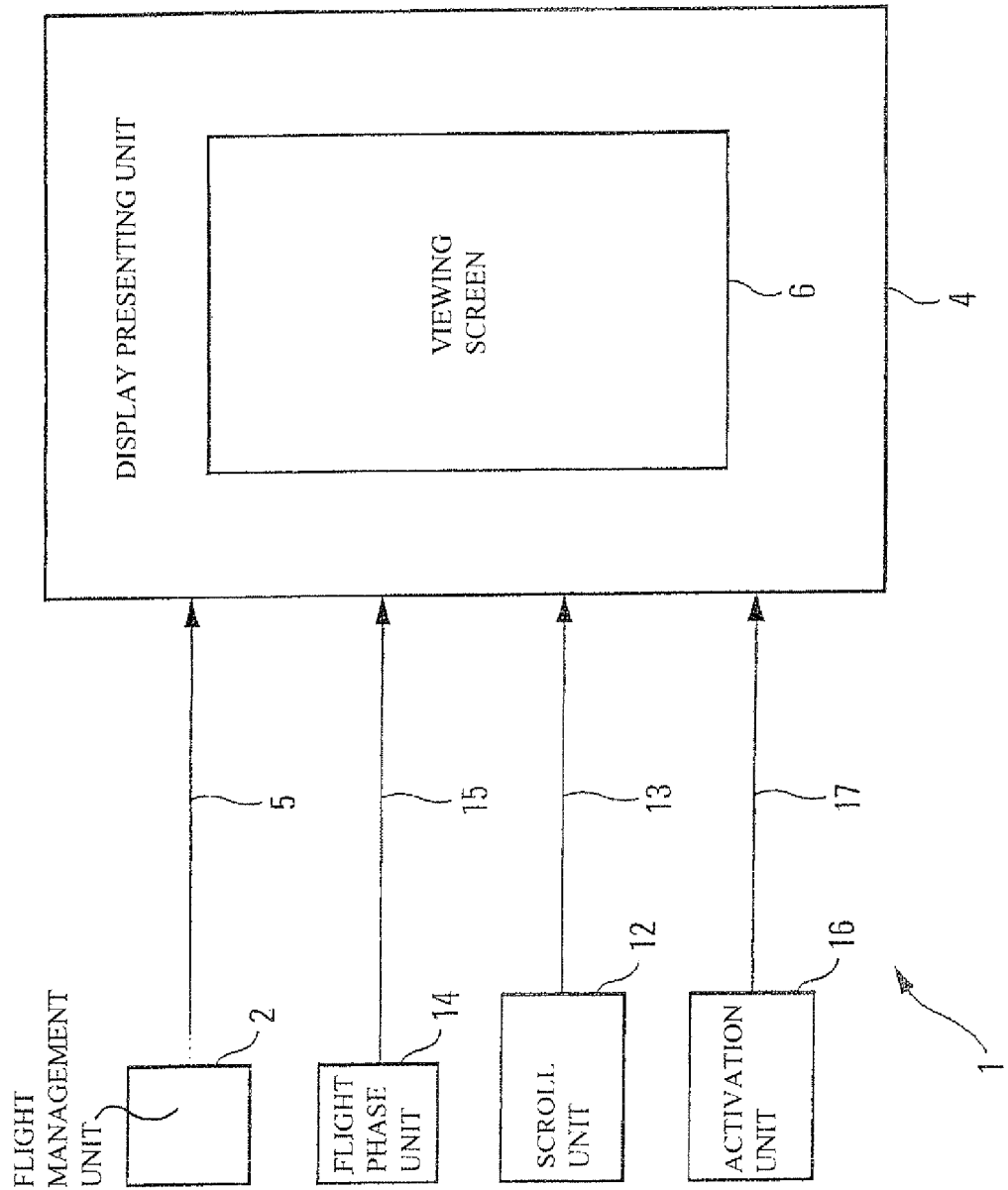
FIG. 1 is the schematic diagram of a device for displaying a flight plan in accordance with the invention.

The device 1 in accordance with the invention and represented diagrammatically in FIG. 1 is intended to display a flight plan of an aircraft, in particular of a transport plane, not represented.

Figure 2:
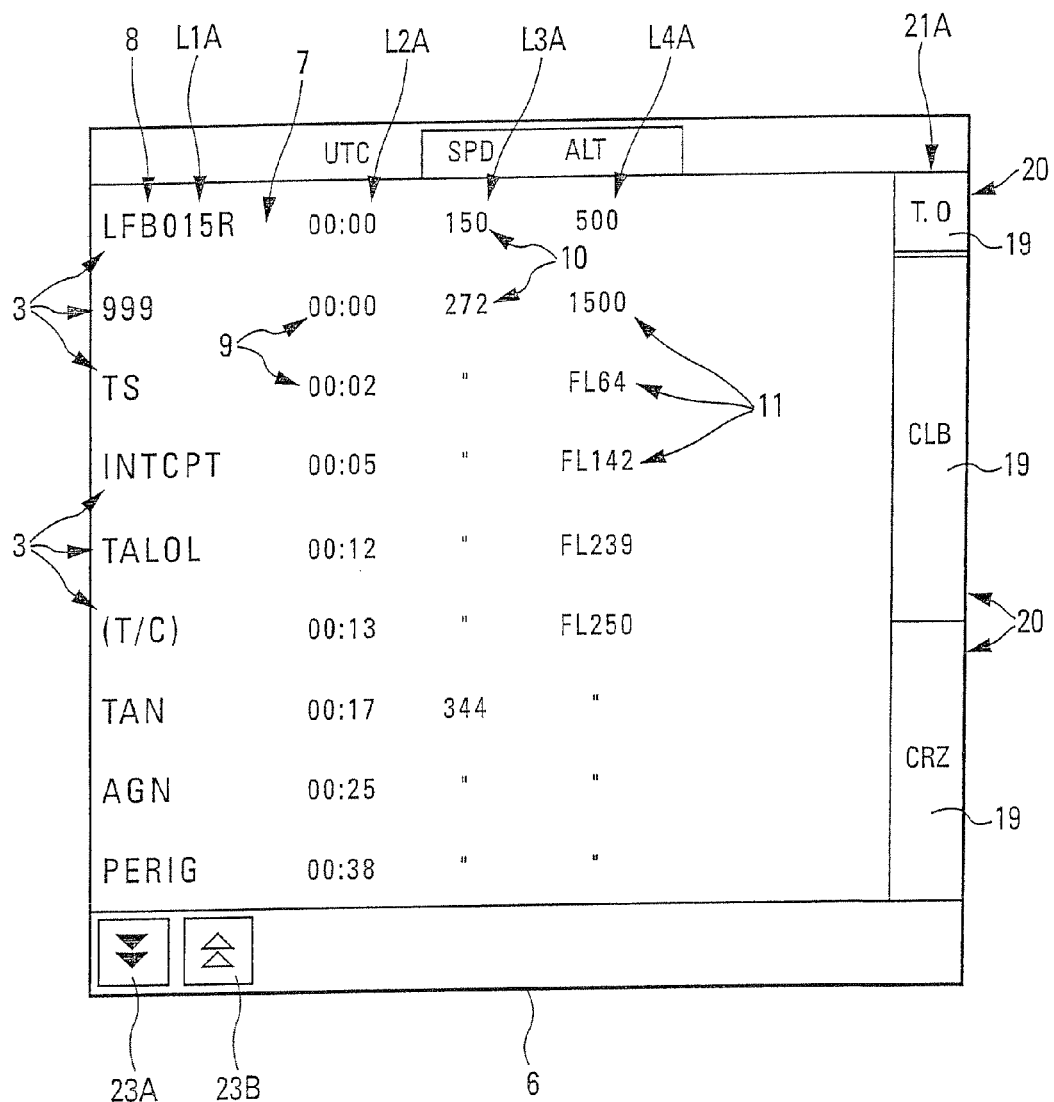
FIGS. 2 and 3 diagrammatically illustrate two particular modes of display of a flight plan, which are carried out in accordance with the invention.
Figure 3:
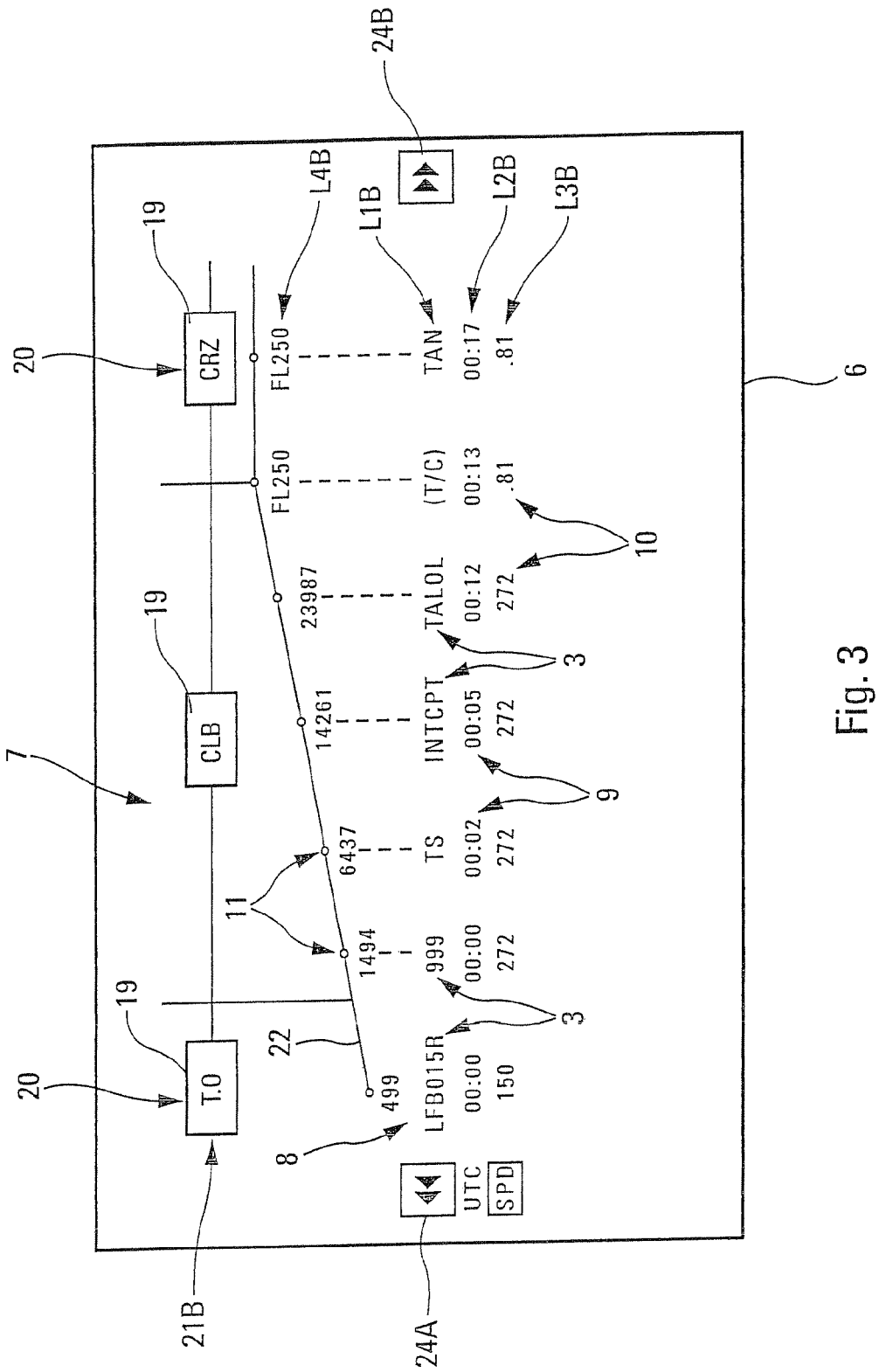

To do this, the said device 1 comprises:
- means 2, comprising for example a flight management system in particular of FMS type, for determining, in standard fashion, the flight plan PDV of the aircraft. In a standard fashion, such a flight plan PDV comprises a plurality of waypoints 3 such as shown in FIGS. 2 and 3;
- means 4 which are connected by way of a link 5 to said means 2 and which are formed in such a way as to present, on at least one viewing screen 6, for example a multifunction display and control screen of MCDU type, at least one flight plan page 7 (called the main page within the framework of the present invention), as represented in particular in FIGS. 2 and 3. This main page 7 shows at least part of a set of indications 8 which illustrates said flight plan PDV. By virtue of the size of the screen 6 and depending on the number of waypoints 3 of the flight plan PDV, this set of indications 8 is shown either in full, or generally part only as in FIGS. 2 and 3. This set of indications 8 makes it possible to identify the waypoints 3 and provides additional information (emanating for example from said means 2) relating to these waypoints 3, such as for example indications of the time of transit 9 (which are provided in FIGS. 2 and 3 under the initials UTC standing for "Universal. Time Coordinated"), speed indications 10 (provided under the initials SPD standing for "speed") and altitude indications 11 (provided under the initials ALT). The set of indications 8 may also comprise auxiliary points which separate phases; and
- means 12 which are connected by way of a link 13 to said means 4 and which enable an operator, for example the pilot of the aircraft, to scroll said set of indications 8 presented on the viewing screen 6.

According to the invention, said device 1 moreover comprises:
- means 14 which are connected by way of a link 15 to said means 4 and which are formed in such a way as to determine, for each of the waypoints 3 of the flight plan PDV, a flight phase PH which is associated with this waypoint 3; and
- means 16 which are connected by way of a link 17 to said means 4 and which enable an operator, for example the pilot of the aircraft, to activate an identification zone 19 specified herein below.

Moreover, according to the invention, said means 4 are formed in such a way as to present, on the viewing screen 6, in addition to the aforesaid indications, a plurality of indication means 20 which are associated with said set of indications 8 and represented in FIGS. 2 and 3.

According to the invention, each of said indication means 20 is such that it comprises an identification zone 19 which designates a particular flight phase PH. Moreover, according to the invention:
- said identification zone 19 is positioned on the viewing screen 6 alongside or in proximity to one or more waypoints 3 which form part of the flight phase PH designated by this identification zone 19 so that, for each waypoint 3 of the flight plan PDV, an operator is thus able to ascertain the corresponding flight phase PH simply by observing the screen 6; and said identification zone 19 is of interactive type. This signifies that, when this identification zone 19 (or the indication means 20) is activated by an operator by way of said means 16, as specified herein below, the viewing screen 6 replaces said main page 7 (or flight plan page) with a flight phase page which provides information about the particular flight phase PH designated by the identification zone 19 which has just been activated.

Within the framework of the present invention, an identification zone 19 may be marked in particular by a particular color code, by a particular sign and/or by a particular alphanumeric indication, such as represented for example in FIGS. 2 and 3. In these exemplary embodiments, the indication zones 19 are marked by initials illustrating the various flight phases PH, such as in particular:

T.O. for "take-off", that is to say for the take off phase;
CLB for "climb" that is to say for the climb phase; and
CRZ for "cruise", that is to say for the cruising phase.

A single indication means 20 may thus be provided for several successive waypoints 3 forming part of the same flight phase, as is the case for example for the indication means 20 marked by the initials CLB in FIGS. 2 and 3.

Consequently, by virtue of the interactive nature of the identification zones 19, an operator, in particular the pilot of the aircraft, can directly access the information relating to the flight phase PH which is associated with a particular waypoint 3. Moreover, by virtue of the identification nature of these identification zones 19, the operator can readily identify the flight phase PH of which each waypoint 3 of the flight plan PDV forms a part.

Within the framework of the present invention, an identification means 20 therefore has a dual function:
a function of aiding direct access to the flight phase PH corresponding to a waypoint 3 considered;
a function of identifying this corresponding flight phase PH.

The display device 1 in accordance with the invention therefore makes it possible to reduce the workload of the pilot, by providing in a very intuitive manner information about the flight plan PDV, and by making it possible to access, in a fast, easy and intuitive manner, information tied to a flight phase PH and presented on an appropriate flight phase page (not represented).

Preferably, said flight phase page comprises at least some of the following information relating to the flight phase PH considered:
information relating to performance:
predictions; and
parameters defining said flight phase.

Said display device 1 can also comprise means (not represented) for instructing:
a direct return from a flight phase page to the main page 7, thereby making it possible to facilitate as appropriate a return to said main page 7 (or flight plan page); and/or
direct access to the previous or next phase.

Furthermore, in a particular embodiment, said device 1 moreover presents, on the viewing screen 6, at least one auxiliary indication means (not represented):
which is situated on said set of indications 8 at a datum (time of transit indicator 9, speed indicator 10, altitude indicator 11) relating to a waypoint 3 of the flight plan PDV;
which is of interactive type, for example such as the indication means 20; and
which enables an operator to directly access a particular modification page making it possible to directly modify the value of the said datum, for example the altitude of a waypoint.

This particular embodiment therefore enables a modification at the flight plan PDV to be made easier and simpler.

In a first embodiment represented in FIG. 2, said set of indications 8 presents a textual form and comprises a list L1A of waypoints 3, which is presented vertically, as well as associated information which is also viewed vertically on the viewing screen 6, in particular in the form:
of a list L2A of time of transit indications 9;
of a list L3A of speed indications 10; and
of a list L4A of altitude indications 11.

Moreover, the indication means 20 are arranged in the form of a column 21A, being aligned vertically in relation to said list L1A.

In this first embodiment, an operator can scroll, with the aid of the means 12, the whole of the flight plan PDV, that is to say the whole of the set of indications 8 and therefore simultaneously the lists L1A, L2A, L3A, L4A and 21A, and to do so respectively upwards or downwards. To do this, these means 12 cooperate with actuation means 23A and 23B which are intended respectively for scrolling down and for scrolling up, and which are provided on the display screen 6. In a first variant embodiment, these actuation zones 23A and 23B are cursor-sensitive zones which may be designated and validated by said means 12 which are, for example, embodied in the form of a mouse. In a second variant embodiment, said means 12 are embodied in the form of a touch-sensitive surface so that when an operator touches the viewing screen 6 at the level of the actuation zones 23A and 23B, he directly instructs the scrolling of the set of indications 8.

Furthermore, the means 16 which are intended to actuate the indication means 20 may also be embodied, either in the form of touch sensitive elements provided directly on the viewing screen at the level of said indication means 20, or in the form of means for designation and validation of said means 20 which are then cursor-sensitive zones.

Furthermore, in a second embodiment represented in FIG. 3, said set of indications 8 presents a textual and graphical binary form comprising:
a graphical view which illustrates a vertical plane and which presents graphically, by way of a main plot 22, said flight plan PDV in said vertical plane that is to say the vertical flight trajectory; and
textual data relating to the waypoints 3, which are disposed on said main plot 22 (as regards the altitude indications 11 for example) or in proximity to it (as regards the time of transit indications 9 and the speed indications 10 for example).

Such a presentation of information which is both graphical and textual makes it possible to simplify the reading and comprehension of the information viewed. In particular, the operator can get his bearings graphically on the flight plan before choosing the exact point at which he wishes possibly to make a modification or relating to which he reckons possibly to recover information.

Presented in FIG. 3 are the waypoints 3, the transit indications 9, the speed indications 10, the altitude indications 11 and the indication means 20, respectively in the form of horizontal lists L1B, L2B, L3B, L4B and 21B.

In this second embodiment, the device 1 can present moreover, on said set of indications 8, the following data (not represented in the figures),
an auxiliary plot illustrating the profile of the terrain which is situated under said flight plan (that is to say under said plot 22). Thus, the pilot knows the terrain which is situated under his trajectory 22 along the flight plan; and/or
additional information relating to particular constraints. By way of example, an aerial route passing just above an altitude constraint can be symbolized.

The vertical flight trajectory that made it possible to form said main plot 22 may be either schematic, or originate from predictions obtained from a flight management system of the aircraft. In the example of FIG. 3, the viewing screen 6 presents a display format of "landscape" type. It is possible to envisage combining a great deal of information on such a format, so as to free up some space on other screens in the flight deck. In this embodiment of FIG. 3, the pilot can scroll the whole of the flight plan right (24B) or left (24A), with the aid of the means 12 which act on actuation zones 24A and 24B identical to the actuation zones 23A and 23B of FIG. 2.

It will be noted that the direct link (obtained by virtue of the invention) between the flight phases PH and the flight plan PDV makes it possible to dispense with a somewhat rigid standard presentation of the flight, which hitherto consisted of a fixed and ordered number of phases (take off, followed by climb, followed by cruising, followed by descent, followed by approach, following by landing). Henceforth, the pilot can plan several cruising phases, for example intercut by a landing, with a single flight plan, which may be beneficial when using the aircraft in shuttle form, for which the aircraft makes one and the same return trip throughout the day. In this case, a single flight plan of departure/arrival/departure type suffices for operations, thereby avoiding certain manipulations and decreasing the risk of error.

Furthermore, within the framework of use on a military aircraft, this direct link (obtained by virtue of the invention) between the flight phases PH and the flight plan PDV makes it possible to readily access in a visual manner, for each flight phase PH, a page making it possible to define the strategy, in particular in terms of performance (for example engines running at reduced noise for a phase preceding a parachute drop) and of predictions (strategy relating to fuel), all the more so when several phases of cruising at high and low altitudes, separated by climbs and descents, may be strung together.

The invention claimed is:

1. A method of displaying a flight plan of an aircraft, comprising:
   determining the flight plan of the aircraft using a plurality of successive waypoints;
   presenting at least one main page including at least part of a set of indications which illustrates said flight plan on at least one viewing screen of the aircraft, said set of indications configured to identify said waypoints and providing additional information relating to the waypoints;
   a scroll unit configured to scroll said set of indications presented on the viewing screen and for operator use;
   determining a flight phase which is associated with a respective waypoint for each of said waypoints; and
   presenting a plurality of indication sections, associated with said set of indications, on said viewing screen, each of said indication sections including:
   an identification zone which designates a particular flight phase; and
   the flight phase of said identification zone positioned on the viewing screen alongside or in proximity to one or more of said waypoints so that each of said waypoints of the flight plan is associated with the corresponding flight phase and is presented together on the viewing screen, wherein:
   the identification zone of each of said indication sections is of an interactive type so that, when the identification zone is activated, the viewing screen replaces said main page with a flight phase page which provides information about the particular flight phase designated by said identification zone; and
   an activation unit configured to activate an identification zone which is configured for use by the operator.

2. The method as claimed in claim 1, wherein instructions are provided for a direct return from a flight phase page to the main page.

3. The method as claimed in claim 1, wherein at least one auxiliary indication is presented on the viewing screen, which is situated on said set of indications at a datum of a waypoint of the flight plan, is of the interactive type, and allows the operator to directly access a particular modification page to directly modify a value of said datum.

4. The method as claimed in claim 1, wherein said set of indications presents a textual form and comprises lists of said waypoints and of associated information, which are viewed vertically on the viewing screen.

5. The method as claimed in claim 1, wherein said set of indications presents a textual and graphical binary form comprising:
   a graphical view which illustrates a vertical plane and which presents graphically, by way of a main plot, said flight plan in said vertical plane; and
   textual data relating to the waypoints which are associated with said main plot.

6. The method as claimed in claim 5, wherein an auxiliary plot illustrating a profile of terrain which corresponds to the terrain associated with said flight plan is presented on said set of indications.

7. The method as claimed in claim 5, wherein additional information relating to particular constraints is presented on said set of indications.

8. A device for displaying a flight plan of an aircraft, comprising:
   a flight management unit determining the flight plan of the aircraft which comprises a plurality of successive waypoints;
   a display presenting unit presenting, on at least one viewing screen of the aircraft, at least one main page comprising at least part of a set of indications which illustrates said flight plan, the set of indications configured to identify said waypoints and providing additional information relating to said waypoints;
   a scroll unit enabling an operator to scroll said set of indications presented on the viewing screen;
   a flight phase unit determining, for each of said waypoints, a flight phase which is associated with a corresponding waypoint, said display presenting unit, on said viewing screen associated with said set of indications a plurality of indication sections, each of said indication sections including:
   an identification zone which designates a the flight phase; and
   the flight phase of said identification zone positioned on the viewing screen alongside or in proximity to one or more of said waypoints so that, for each waypoint of the flight plan, the corresponding flight phase is presented together on the viewing screen, wherein:
   said display presenting unit are such that said identification zone of each of said indication section is of an interactive type so that, when the identification zone is activated, the viewing screen replaces said main page with a flight phase page which provides information about the flight phase designated by said identification zone; and
   an activation unit enabling an operator to activate the identification zone.

9. The method of claim 1 executed by an aircraft device.

10. The device specified under claim 8, wherein the device is an integral component of an aircraft.

* * * * *